3,201,268
STABILIZATION OF CLAY SOILS AND AGGREGATES WITH LEAD SALTS OF PHOSPHORIC AND SULFURIC ACIDS
John B. Hemwall, Midland, Mich., assignor to The Dow Chemical Company, Midland, Mich., a corporation of Delaware
No Drawing. Filed June 21, 1962, Ser. No. 204,089
2 Claims. (Cl. 106—68)

This invention is concerned with the consolidation and stabilization of argillaceous soils and clay-containing aggregates and is particularly directed to a method and composition embodying a mixture thereof with an at least slightly water-soluble lead salt and phosphoric acid or both phosphoric and sulfuric acids to accomplish such stabilization.

Many clay soils cause problems, for example, in the construction industry, because of their tendency to become plastic and flowable when wetted. Also, it is desirable in many parts of the world to use clay soils or clay-containing aggregates as building materials, as for example, in the adobe structures of the Southwestern United States and Mexico. Various materials have been added to clay soils and aggregates in an attempt to improve their water repellency or to maintain the strength of the mateiral when wetted.

It is an object of the present invention to provide a method and composition for stabilizing argillaceous soils and construction materials. It is a further object to provide stabilized argillaceous materials having improved strength when exposed to water. Yet another object is to provide stabilized argillaceous compositions employing inexpensive and readily available additaments. Other objects will become apparent from the following specification and claims.

In accordance with the present invention, it has been discovered that the incorporation in argillaceous soils of an at least slightly water-soluble lead salt followed by, or following, the incorporation of aqueous orthophosphoric acid or aqueous orthophosphoric and sulfuric acids provides a composition which may be compacted and cured to produce a stabilized mass having significantly improved unconfined compressive strength as compared with untreated argillaceous soil. It is among the advantages of the invention that the argillaceous soil so treated retains its strength even when immersed in water.

The term "argillaceous soil" as used herein refers to soils containing at least 15 percent by weight of clay minerals and not more than 50 percent sand and is exclusive of organic soils, such as peat, of calcareous soils, that is, soils containing greater than 0.5 percent calcium carbonate, and of predominantly sandy soils, that is, soils containing more than 50 percent sand. The term "clay" as used herein refers to widely distributed colloidal earthy substances, plastic when moist, which are composed primarily of decomposed igneous and metamorphic rocks rich in the mineral feldspar, in the form of crystalline grains less than 0.002 millimeter in diameter, whose essential constituents are kaolin, montmorillonite and other hydrous silicates of alumina. For the purposes of the present invention, the clay, silt and sand content of the soil are determined by standard methods as described, for example, by Bouyoucos in Soil Science, volume 44, pages 345 and 246.

In carrying out the invention, the phosphoric acid alone or followed by, following or together with sulfuric acid is mixed together with the argillaceous soil or clay aggregate in any suitable fashion either prior to or following the mixing together with said soil or clay aggregate of an at least slightly water-soluble lead salt in proportions to give 0.05 to 0.5 mole of lead per mole of $H_3PO_4$ and from 0 to 3.5 moles $H_2SO_4$. The amount of P added to the soil as $H_3PO_4$ ranges between 0.1 and 5 weight percent based on dry soil weight or between 0.67 and 33.33 percent based on dry clay aggregate. The phosphoric acid is advantageously added as aqueous orthophosphoric acid, as indicated previously, or as equivalent phosphoric pentoxide, pyrophosphoric acid, metaphosphoric acid or tetraphosphoric acid, all of which can be used as the source of orthophosphoric acid. Advantageously, a mixture of phosphoric and sulfuric acid is diluted with up to several volumes of water per volume of mixed acids to bring the soil or aggregates to optimum moisture content or less. The lead salt is also added as an aqueous solution. It is immaterial what lead salt is used so long as it provides an aqueous solution having a concentration sufficient to give the indicated proportion of Pb to soil and to $H_3PO_4$ or to $H_3PO_4$ and $H_2SO_4$, and so long as it does not react violently or harmfully with the soil or aggregate. In the soil or clay aggregate, water-insoluble lead phosphate or a mixture predominately of lead phosphate and some lead sulfate is formed in situ. Obviously, the definition of lead salts excludes the phosphate and sulfate salts. Representative lead salts useful in the practice of this invention include lead chloride, lead acetate (anhydrous, trihydrate, decahydrate or any of the basic forms), lead bromide, lead citrate, lead ethylsulfate, lead fluosilicate, lead formate, lead hypophosphite, lead hyposulfate, lead nitrate, lead lactate, lead phenolsulfonate, lead propionate, lead salicylate, and the like.

In a preferred method of operation, an acid solution, as set forth above, is preferably diluted with several volumes of water and is sprayed on to the soil while the latter is stirred or otherwise mixed. Thereafter the so-treated soil is admixed with an aqueous lead salt solution, and is compacted by conventional means as by tamping, rolling, or the like. Following the mixing and compacting steps, it is desirable to maintain the treated soil in a moist but not soaked condition, advantageously at 90 to 100 percent relative humidity, for a period of time sufficient, usually from about 1 to 6 days to provide for curing of the mixture with concurrent development of the desired unconfined compressive strength properties. Alternatively, the soil or aggregate can be mixed with lead salt solution, then with the acid solution.

In operations where the argillaceous soil or aggregate is excavated and treated, as for the preparation of sun-dried building materials, the mixing of the lead salt and acid solution can be carried out in conventional mixing equipment such as ribbon mixers, sand mullers, pug mills or the like. Thereafter the mixture of soil or aggregate, lead salt and acid may be compacted, for example, by ramming or pressing in molds. Alternatively, where it is desired to stabilize argillaceous soil in place as in the preparation of dams or subsurfaces for road building, the lead salt and acid may be applied by spraying followed by a mixing operation, and the mixture compacted by the use of sheepsfoot rollers and the like.

For the purposes of the invention, technical or by-product acids are more advantageously used with the lead salt for reasons of economy and availability wherein impurities, if any, are inert or are such as not to vitiate the effects of the added acid.

The amounts of phosphoric or phosphoric and sulfuric acids to be employed in accordance with the invention will vary somewhat within the ranges previously indicated, depending upon such factors as the nature and composition of the argillaceous soil or clay aggregate and the degree of strengthening required in a particular application. In general, the phosphoric acid is employed in the form of orthophosphoric acid in amount sufficient to provide, with sulfuric acid and lead salt a proportion of from about one mole of $H_3PO_4$ per 0.05 to 0.5 mole of Pb and 0.0 to 3.5 moles $H_2SO_4$ and to provide 0.1 to 5 percent elemental P as $H_3PO_4$ on a dry soil weight basis. In a particular instance, the lead salt and acid requirements within the above limitations can be determined by a series of tests with varying amounts of lead salt and acid on representative portions of the particular soil to be treated, for example, in accordance with the procedure outlined in Example 1 below.

The following examples describe completely representative specific embodiments of this invention and set forth the best mode contemplated by the inventor of carrying out the invention. The examples are not to be construed as limiting the invention other than as defined in the appended claims.

The following soils were used in the reported examples:

TABLE I

| Soil | Mechanical Analysis, Percent | | | pH | Organic Matter, Percent |
|---|---|---|---|---|---|
| | Clay | Silt | Sand | | |
| F1 | 18 | 56 | 26 | 7.0 | 1.3 |
| F4 | 37 | 43 | 20 | 7.1 | 1.4 |

*Example 1*

Two 200 g. aliquots of soil F4 were prepared and to one of them was added 3.05 g. of $PbCl_2$ with mixing. Both aliquots were then sprayed with 20 ml. of an aqueous solution of 5 g. of 85 percent $H_3PO_4$. Two approximately 90 g. subsamples of each were placed in tubular molds 3 cm. in diameter. The samples were then compressed from both ends in the mold at a pressure of 737 p.s.i. The resulting soil cylinders or plugs were ejected from the molds and aired in a high humidity atmosphere (90–100 percent) at room temperature for 6 days.

After 6 days' cure, the samples were immersed in distilled water for 24 hours. After immersion, the samples were tested for their unconfined compressive strength (UCS) using the unconfined compression test apparatus, Model U-160, manufactured by Soiltest Inc. The results of this test are shown below:

| Treatment | UCS, p.s.i. |
|---|---|
| 5.5 mmoles Pb+21.7 mmoles $H_3PO_4$ per 100 g. soil | 238 |
| 21.7 mmoles $H_3PO_4$ per 100 g. soil | 180 |

*Example 2*

Two 200 g. aliquots of soil F1 were prepared and to one was added 3.05 g. of $PbCl_2$ with mixing. Both aliquots were then sprayed with 23 ml. of a solution which contained 5 g. of 85 percent $H_3PO_4$ and 3.5 g. of concentrated $H_2SO_4$.

Duplicate plugs were made from each of the above mixtures, cured and tested as in Example 1. The results are shown below:

| Treatment | UCS, p.s.i. |
|---|---|
| 21.7 mmoles $H_3PO_4$+35 mmoles $H_2SO_4$ per 100 g. soil | 416 |
| 21.7 mmoles $H_3PO_4$+35 mmoles $H_2SO_4$+5.5 mmoles Pb per 100 g. soil | 474 |

Equally advantageous results are obtained when other lead salts, as previously set forth, are substituted in place of $PbCl_2$. Also greater or lesser amounts of $H_3PO_4$ or $H_3PO_4$ together with $H_2SO_4$ can be used advantageously within the limits previously set forth.

What is claimed is:

1. A method of stabilizing an argillaceous soil containing at least 15 weight percent clay and not more than 50 percent sand by distributing throughout said soil a mixture of a water-soluble lead salt and acid of the group consisting of orthophosphoric acid and its mixtures with sulfuric acid in amount sufficient to provide a proportion of from 0.1 to 5 weight percent of phosphorus as phosphoric acid on a dry soil weight basis, said mixture providing from 0.05 to 0.5 molar proportions of lead per mole of $H_3PO_4$ and 0 to 3.5 mole $H_2SO_4$ and compacting and curing said compacted soil at a relative humidity of 90 to 100 percent for a time sufficient to increase its unconfined compressive strength.

2. A mixture of an argillaceous soil having at least 15 weight percent clay and not more than 50 percent sand with a water-soluble lead salt and acid of the group consisting of phosphoric acid and its mixtures with sulfuric acid, said soil mixture having a proportion of from 0.1 to 5 weight percent of phosphorus as phosphoric acid on a dry soil weight basis, from 0.05 to 0.5 molar proportions of lead per mole of $H_3PO_4$ and 0 to 3.5 moles $H_2SO_4$.

References Cited by the Examiner

UNITED STATES PATENTS 2,072,212  3/37  Moosdorf et al. _____ 106—68

TOBIAS E. LEVOW, *Primary Examiner.*